US007845667B2

(12) United States Patent
Mahler et al.

(10) Patent No.: US 7,845,667 B2
(45) Date of Patent: Dec. 7, 2010

(54) BACKPACK RELOCATOR

(75) Inventors: Sebastian Mahler, Tampa, FL (US); Alec E. Beasley, Tampa, FL (US); Ramy Wassef, Clearwater, FL (US); Vanja Kravarusic, St. Petersburg, FL (US); Shawn Shoemaker, Myakka City, FL (US)

(73) Assignee: University of South Florida, Tampa, FL (US)

( * ) Notice: Subject to any disclaimer, the term of this patent is extended or adjusted under 35 U.S.C. 154(b) by 592 days.

(21) Appl. No.: 11/857,046

(22) Filed: Sep. 18, 2007

(65) Prior Publication Data

US 2008/0069678 A1 Mar. 20, 2008

Related U.S. Application Data

(60) Provisional application No. 60/826,018, filed on Sep. 18, 2006.

(51) Int. Cl.
*A61G 5/10* (2006.01)
*B60R 9/00* (2006.01)

(52) U.S. Cl. ..................... 280/304.1; 224/407; 224/282

(58) Field of Classification Search ................. 224/407, 224/281, 282; 280/304.1; 312/28; 297/188.05, 297/188.21, 162; 414/462, 679
See application file for complete search history.

(56) References Cited

U.S. PATENT DOCUMENTS 3,845,891 A * 11/1974 Becher .................... 224/42.21
4,861,059 A 8/1989 Shirk
4,919,443 A * 4/1990 Kehler ..................... 280/304.1
5,180,181 A 1/1993 Letechipia
5,299,824 A 4/1994 Roberts et al.
5,588,663 A 12/1996 Rundle et al.
5,957,346 A * 9/1999 Schambre et al. ........ 224/42.21
6,269,992 B1 8/2001 Miller (Continued)

FOREIGN PATENT DOCUMENTS

DE 19742288 A1 9/1997

(Continued)

OTHER PUBLICATIONS

Chanchavac, S.; Jain, A.; Pham, D.; Pruehsner, W.; Enderle, J.D. “Wheelchair assist devices.” Bioengineering Conference. 2001. Proceedings of the IEEE 27th Annual Northeast. 2001. pp. 97-98.

(Continued)

*Primary Examiner*—Justin M Larson
(74) *Attorney, Agent, or Firm*—Robert Varkonyi; Smith & Hopen, P.A.

(57) ABSTRACT

A device to help an individual with a disability carry his or her bag or storage unit on their wheelchair or other mobility device, without requiring a large space to deploy the storage and retrieval product. The invention consists of a set of arms, connected to a sliding mechanism along a track. When the user wishes to access his or her belongings, the bag slides from a storage position behind the wheelchair to a retrieval position perpendicular to the wheelchair's armrest. The deployment process is accomplished without rotating the entire mechanism around a central axis. Thus, the invention keeps the storage unit close to the wheelchair and therefore takes up less space during retrieval and increases stability during deployment.

11 Claims, 6 Drawing Sheets

U.S. PATENT DOCUMENTS

| | | | | |
|---|---|---|---|---|
| 6,427,888 | B1 * | 8/2002 | Condon et al. | 224/310 |
| 7,344,055 | B2 * | 3/2008 | Macocha | 224/407 |
| 7,402,019 | B2 * | 7/2008 | Alexander | 414/462 |
| 7,651,111 | B2 * | 1/2010 | Butler | 280/304.1 |
| 2005/0001405 | A1 | 1/2005 | Macocha | |
| 2008/0156838 | A1 * | 7/2008 | Johnson | 224/407 |

FOREIGN PATENT DOCUMENTS

| | | | |
|---|---|---|---|
| DE | 202004010479 | U1 | 1/2005 |

OTHER PUBLICATIONS

Jorge Perez. "Backpack Retriever."; NSF 2001 Engineering Senior Design Projects to Aid Persons with Disabilities. (John D. Enderle and Brooke Hallowell). 2002. Creative Learning Press, Inc. Mansfield Center, Connecticut 06250. pp. 234-235.

Javier Santiago. "Tray Placer."; NSF 2001 Engineering Senior Design Projects to Aid Persons with Disabilities. (John D. Enderle and Brooke Hallowell). 2002. Creative Learning Press, Inc. Mansfield Center, Connecticut 06250. pp. 236-237.

* cited by examiner

BACKPACK RELOCATOR

CROSS REFERENCES TO RELATED APPLICATIONS

This application claims priority to currently pending U.S. Provisional Patent Application 60/826,018, entitled "Backpack Relocator", filed Sep. 18, 2006, the contents of which are herein incorporated by reference.

FIELD OF INVENTION

This invention relates to a device facilitating storage on a mobility device. More specifically, the invention relocates a bag, storage unit, communication device, or computer from a storage position behind the mobility device, like a wheelchair, to an accessible position alongside the mobility device.

BACKGROUND OF THE INVENTION

Wheelchairs and other mobility devices increase independence for individuals with disabilities. However, wheelchairs do not provide storage for personal belongings. Individuals using wheelchairs as part of their every-day lives often have unique needs when carrying personal belongings and other items. For example, the typical student will often carry his or her books in a backpack when going to and from school. These packs are generally a convenient method for transporting books, but a wheelchair user may find certain aspects of a backpack inconvenient or undesirable for their needs. For instance, during transport the backpack must be placed on the chair in a position that would be secure, such as the rear of the chair. Unfortunately, the secure position may make it extremely difficult to retrieve books and other personal effects from the securely attached pack. Consequently, what is needed is a device that would allow a disabled individual to secure a storage device to a chair for transport while allowing the individual convenient access to the contents of the pack when desired.

The need for storage on wheelchairs and other mobility devices has been recognized for years. However, the articles designed to satisfy this need tend to be bulky, take up large amounts of room while deploying from a stored state to an assessable state, or drastically and adversely affect the stability of the wheelchair or the ability to clear ingress and egress points. Further, some storage devices are not readily accessible by the individual with a disability. For example, Shirk (U.S. Pat. No. 4,861,059) provides for a vertically pivoting box behind the wheelchair. The apparatus clamps to the wheelchair, with the storage unit pivoting on rods mounted to the base of the storage unit. However, the box does not rotate to a position where the wheelchair user may freely access the box.

Kekler (U.S. Pat. No. 4,919,443) and Letechipia (U.S. Pat. No. 5,180,181) both describe a storage box or bag that rotates horizontally on an axis mounted to one edge of the storage box or bag, and rotates from behind the wheelchair to a position above the armrest. Likewise, Roberts, et al. (U.S. Pat. No. 5,299,824) describes a tray that horizontally rotates from the back of the wheelchair to the front, on its axis. More recently, a focus on backpack storage and retrieval solutions has prompted devices designed to hold a backpack, stored behind the wheelchair and deployed horizontally beside the wheelchair's armrest, as evidenced by Perez, et al. (NSF 2001), Chanchavac, et al. (Proc. Of the IEEE), and Matthew (US Pub. No. 2005/0001405). However, these new designs still rely on pivoting the storage unit, here a backpack, around a fixed axis. The bag rotates around on a boom from the rear of the wheelchair to the side, allowing the wheelchair user access. Thus, the new designs still require large areas to deploy, limiting the usefulness of these products. Further, because these designs transfer the backpack through a large arc, to reach the side of the wheelchair, the wheelchair becomes increasingly unstable as the backpack reaches the apex of this arc. Moreover, these designs are not compatible across wheelchair manufacturers.

The current invention provides a way to store belongings behind the wheelchair, and to access the storage without requiring a large space to deploy the storage and retrieval product. When the user wishes to access his or her belongings, the bag slides from behind the wheelchair to the side of the chair, allowing the user access to the contents of the storage device. Previous designs pivot, taking up the full length of the retrieval product, as the product swings around on its axis.

Therefore, what is needed is a device that does not rely on a rotating motion to retrieve the storage device, thereby taking up substantially less space during retrieval and reducing the instability inherent during deployment.

SUMMARY OF INVENTION

A mobility device is defined as a device which allows an individual with a disability to move around. Illustrative examples include wheelchairs and scooters.

The invention is a backpack or bag relocation device for use on a wheelchair. The relocation device mounts universally to a wheelchair or mobility device, so that right- and left-handed users may easily access the device. The relocation device consists of a rail, running along one side of the wheelchair from the front of the wheelchair armrest back behind the seatback of the wheelchair. A slider is linked to the rail, so that the slider moves from a stored position behind the user to a deployed position beside the wheelchair armrest. A first linkage is attached to the slider, via a horizontal pivot on one end of the linkage. A second linkage is connected at one end to the end of the first linkage opposite to the slider pivot. The linkages are connected using another horizontally pivoting joint.

In one embodiment, a hand crank connects to other end of the second linkage, driving the device from a stored to deployed position. Preferentially, a motor is connected to the other end of the second linkage, driving the device. The motor rotates the second linkage horizontally along a vertical axis. The rotation of the second linkage pushes on the first linkage, causing the slider to move along the rail from behind the wheelchair user to a position alongside the armrest.

In a preferred embodiment, the rail runs alongside the wheelchair, and is above the first and second linkages. In its stored position, the slider is behind the wheelchair seatback, and the first linkage is substantially perpendicular to the rail. When the slider is deployed alongside the wheelchair armrest, the first linkage is aligned with the rail and substantially parallel thereto. A receptacle is attached to the first linkage of the device, and designed to receive an article (such as a backpack). When the device is in its stored position, the article is positioned behind the wheelchair seatback. During deployment, the bag slides and rotates forward to a position alongside the wheelchair.

A U-shaped mounting bracket has a tube on one end of the bracket and a lateral surface on the opposing end. The lateral surface links the device to the bracket. On the opposing side of the bracket, the tube fits onto the wheelchair, linking the device to the wheelchair. The device may rotate vertically about on this link.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
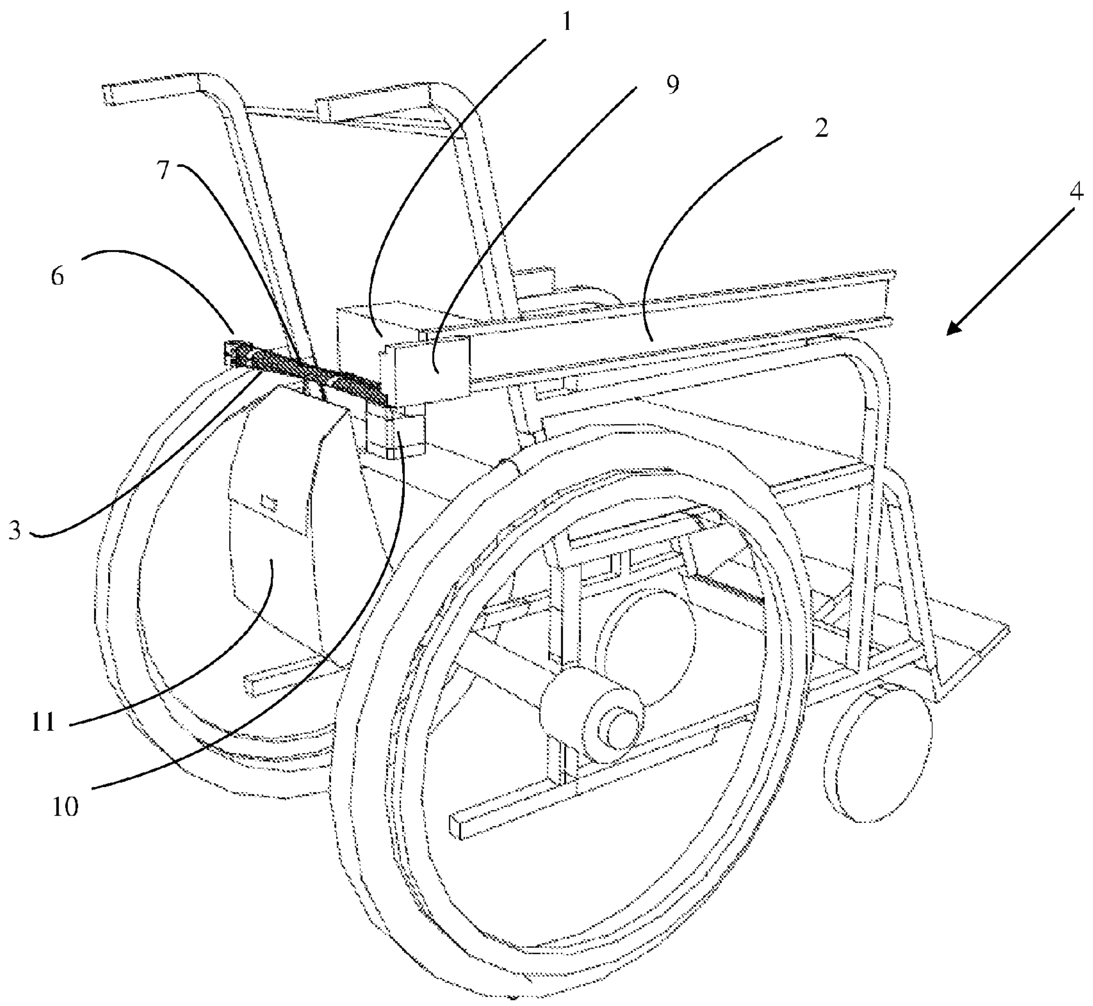
FIG. 1 is a rear perspective view of the relocating device, shown mounted to a wheelchair. The device is in its stored position with a backpack mounted to the device.
Figure 2:
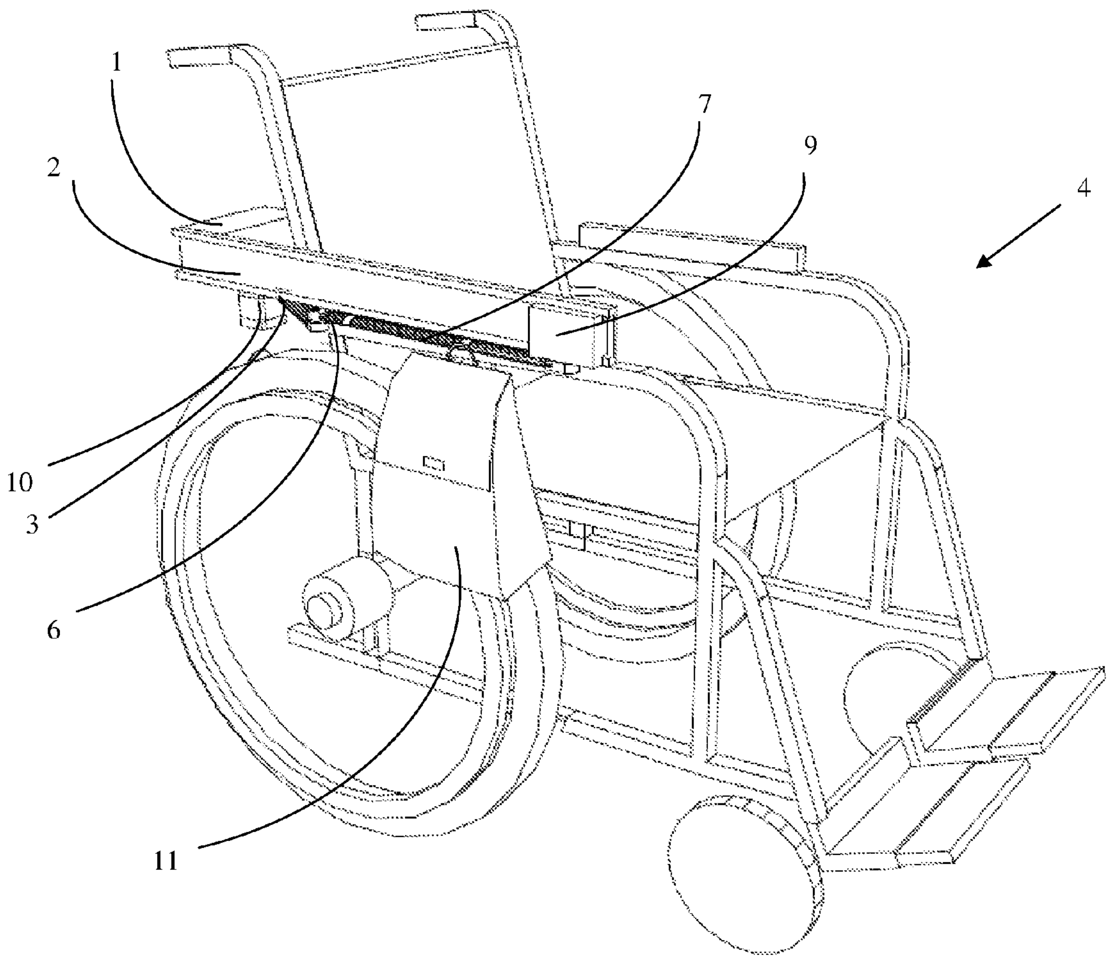
FIG. 2 is a front-quarter perspective view of the relocating device mounted to a wheelchair. As shown, the device is fully deployed with a backpack mounted to the device
Figure 3:
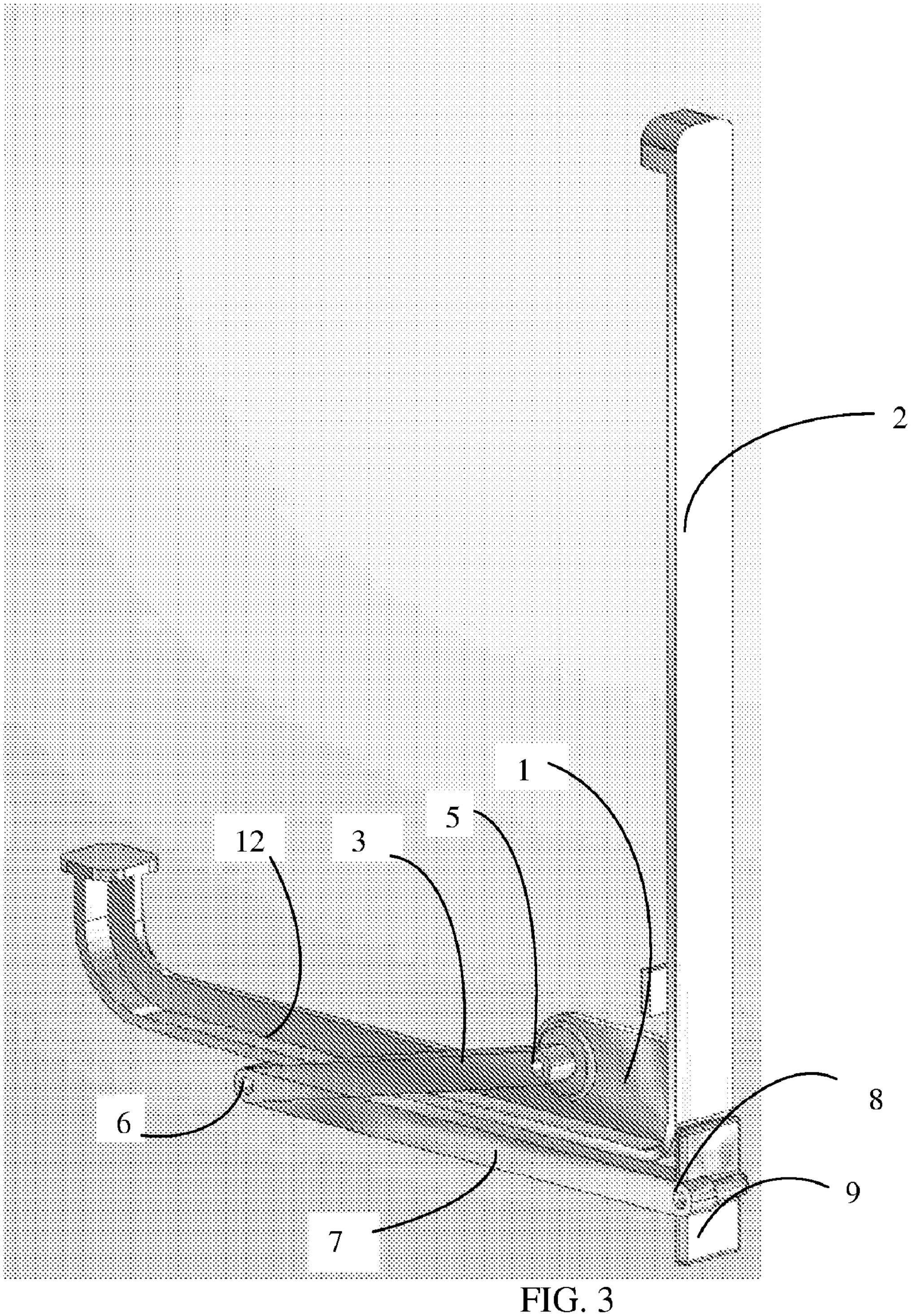
FIG. 3 is a rear prospective view of the bottom of the relocating device (depicted in its stored position).
Figure 4:
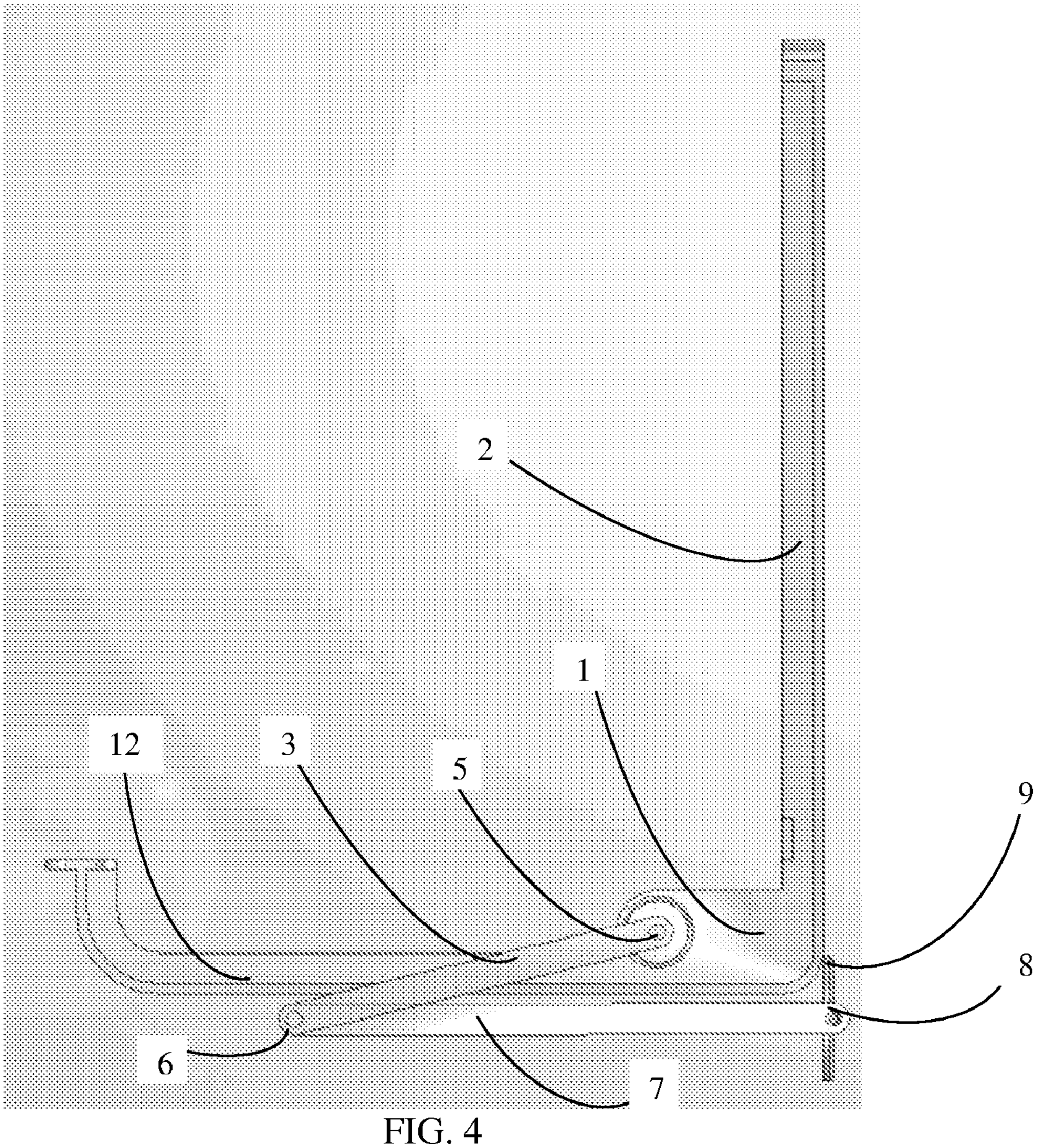
FIG. 4 is a bottom plan view of the relocating device (depicted in its stored position).

The present invention includes a device for retrieving a storage unit from a mobility device, like a wheelchair, as shown in FIGS. 1 and 2. The device attaches to the mobility device using means known in the art. The invention has wide lateral surface 1, located in the back of mobility device 4, just inboard of the side of the mobility device's seatback, seen in FIG. 3. Preferably, the lateral surface is integrated into the U-shaped device, opposite tube mount 13. Circular pivot point 5 attaches to the bottom of the lateral surface, seen in FIG. 4. Rail guide 2 attaches to lateral surface 1, on the outside edge of the lateral surface. Rail guide 2 extends from the back of mobility device 4, just beyond the lagging edge of lateral surface 1, along the side of mobility device 4, beside the leading edge of an armrest on the mobility device.

First linkage 7 is attached to circular pivot point 5, normally hidden beneath drive motor 10, on lateral surface 1, so that the arm rotates freely in a horizontal fashion. The other end of the first linkage has a circular hole and pin pivot point 6. The pin runs through the pivot point on first linkage 7 through second linkage 3, and connects the second linkage to the first. The opposing end of the second linkage has a hole and pin pivot 8. A pin attaches the end of the second linkage to slider mechanism 9. The slider mechanism has a hole in one end, where a pin runs through the slider, attaching the second linkage 3 to the bottom section of the slider mechanism 9, at pivot point 8. A surface adjacent to the bottom of slider mechanism 9 is attached to rail guide 2 using a joint that securely attaches the slider to the rail guides, but allows the slider to freely slide along the rail.

Figure 5:
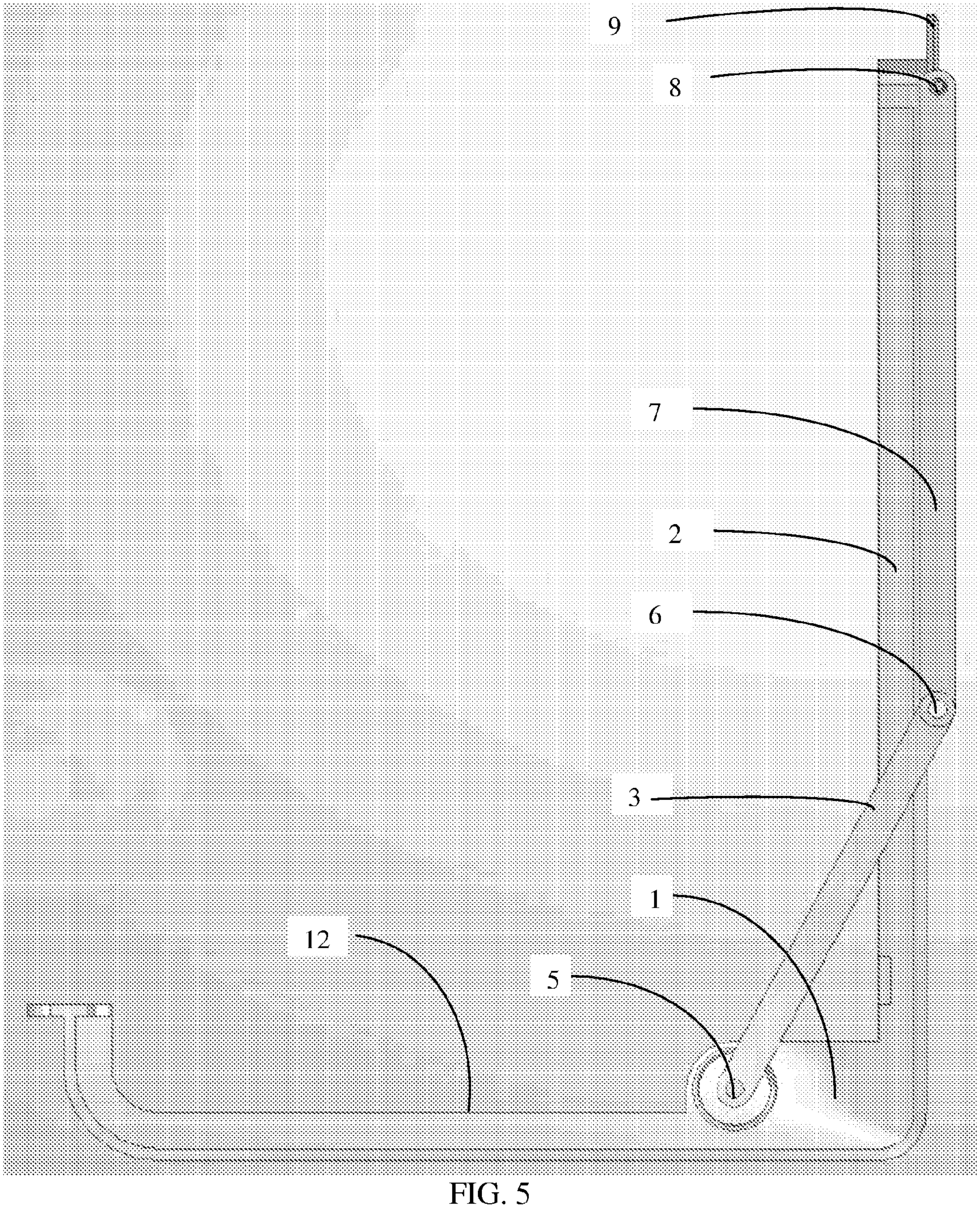
FIG. 5 is a bottom plan view of the relocating device (depicted in its fully deployed position).
Figure 6:
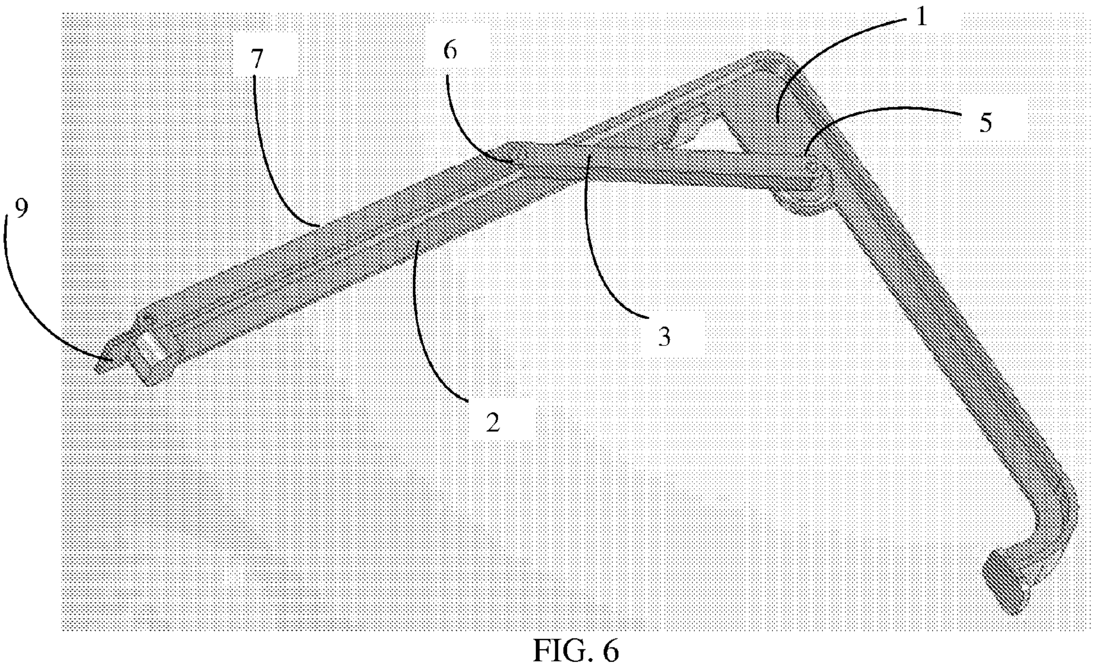
FIG. 6 is front perspective, top-down view of the relocating device (depicted in its fully deployed position).

During deployment, second linkage 3 rotates counterclockwise from a stored position beneath the U-shaped bracket to an extended position below rail guide 2, depicted in FIGS. 5 and 6. In its stored position, second linkage 3 is aligned below and perpendicular to the lagging edge of U-shaped bracket 12. Second linkage 3 is attached to first linkage 7 and slider mechanism 9, and substantially perpendicular to the rail guide, as shown in FIG. 6.

Motor 10 is attached to pivot point 5 beneath the first linkage, on the pivot point attaching second linkage 3 to lateral surface 1. The motor's output drive is attached to pivot point 5, driving first linkage 7 counterclockwise from its stored position, to its extended position. As second linkage 3 rotates out to its extended position, second linkage 3 pushes first linkage 7 forward. First linkage 7 rotates about the second linkage during deployment. First linkage 7, in turn, pushes forward on slider mechanism 9, which causes slider mechanism 9 to travel forward along rail guides 2. As slider mechanism 9 travels forward, first linkage 7 also rotates along the pivot point between first linkage 7 and slider mechanism 9, so that during extension the first linkage rotates about two axis, at pivots 6 and 8, to a position along rail guide 2. As the slider reaches the extended position, first linkage 7 is brought perpendicular to, and below, rail guide 2, as shown in FIGS. 5 and 6.

A mounting point attaches to the second linkage, such that the mount is pointing away from the mobility device-user. The mounting point is a mount known in the art, preferably a hook. The mount is attached to first linkage 7, so that the mount is closer to the slider mechanism than the second linkage, allowing the mobility device-user to mount a storage device, like bag 11 to first linkage 7. As first linkage 7 travels from its stored position to its extended position, it carries bag 11 from a stored position behind the mobility device to an accessible position beside the mobility device, seen in FIGS. 1 and 2. This process slides the bag along an oblong path from the back of the mobility device to the side. The process is accomplished without rotating the entire mechanism around a central axis. As such, the movement of the bag from the back of the wheelchair to the side requires considerably less space than the traditional bag relocators.

Figure 7:
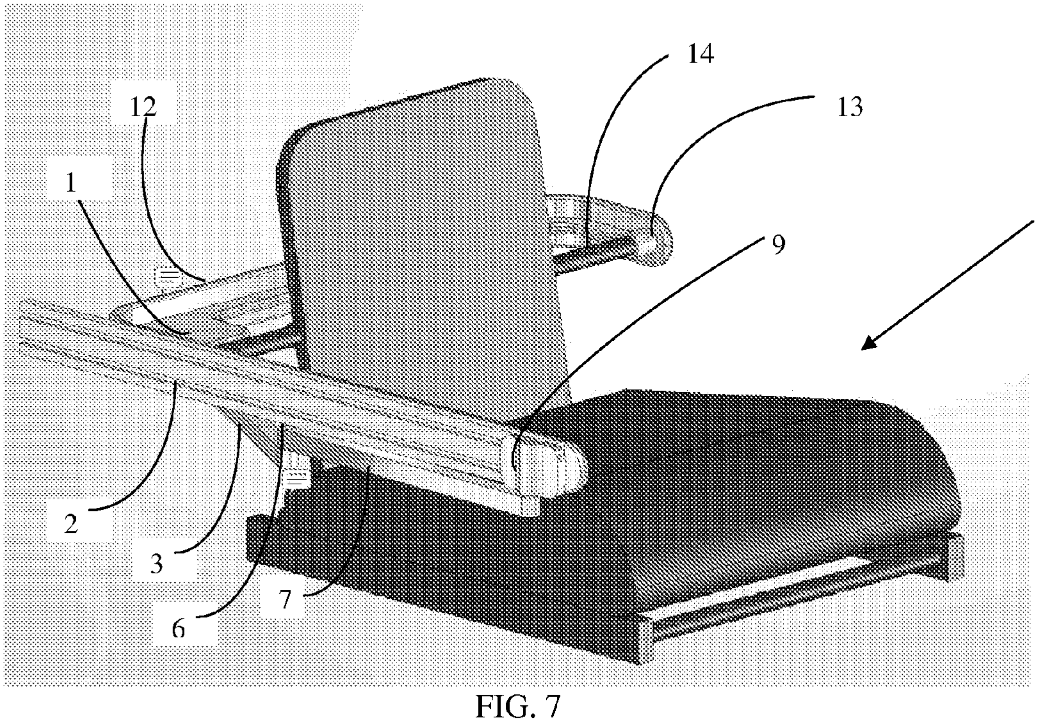
FIG. 7 is a front quarter perspective view of the preferred embodiment, where the device is mounted to a wheelchair using a U-shaped bracket.

Preferably, the device mounts to the mobility device using U-shaped bracket 12, depicted in FIG. 7. Tube 13 is attached to the side of U-shaped bracket 12 opposite lateral surface 1. This enables the U-shaped bracket to mount to horizontal pole 14 on the back of the mobility device.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A device for use with a wheelchair or other mobility device, comprising:

a rail disposed along one side of the wheelchair;

a slider connected to the rail, wherein the slider is adapted to slide along the rail between a first position proximate a first end of the rail and a second position proximate a second end of the rail;

a first linkage having a first end and a second end, wherein the first end is pivotally connected to the slider;

a second linkage having a first end and a second end, wherein the first end is pivotally connected to the second end of the first linkage;

wherein the second linkage rotates along a vertical axis; and wherein the rotation of the second linkage causes the slider to move between the first position and second position via the first linkage.

2. The device of claim 1, wherein the first linkage is substantially perpendicular to the rail when the slider is in the second position.

3. The device of claim 1, wherein the first linkage is substantially parallel to the rail when the slider is in the first position.

4. The device of claim 1, further comprising a receptacle adapted to receive an article.

5. The device of claim 4 wherein the receptacle is affixed to the first linkage.

6. The device of claim 4 wherein the receptacle is positioned behind the wheelchair when the slider is in the second position.

7. The device of claim 4 wherein the receptacle is positioned along the side of the wheelchair when the slider is in the first position.

8. The device of claim 1 wherein the rail is disposed in superior relation to the first and second linkage.

9. The device of claim 1 wherein a motor is connected to the second end of the second linkage.

10. The device of claim 9 wherein the motor causes the second linkage to rotate along a vertical axis.

11. The device of claim 1 wherein the device mounts to a wheelchair such that the device rotates vertically to allow egress and ingress to the wheelchair.

* * * * *